(12) United States Patent
Kilchyk et al.

(10) Patent No.: US 12,312,965 B2
(45) Date of Patent: May 27, 2025

(54) GEARED AIR CYCLE MACHINE

(71) Applicant: Hamilton Sundstrand Corporation, Charlotte, NC (US)

(72) Inventors: Viktor Kilchyk, Lancaster, NY (US); Brent J. Merritt, Southwick, MA (US)

(73) Assignee: hamilton sundstrand corporation, Charlotte, NC (US)

( * ) Notice: Subject to any disclaimer, the term of this patent is extended or adjusted under 35 U.S.C. 154(b) by 135 days.

(21) Appl. No.: 18/075,151

(22) Filed: Dec. 5, 2022

(65) Prior Publication Data

US 2024/0183282 A1 Jun. 6, 2024

(51) Int. Cl.
*F01D 15/12* (2006.01)
*F25B 9/00* (2006.01)
*F25B 9/06* (2006.01)

(52) U.S. Cl.
CPC .............. *F01D 15/12* (2013.01); *F25B 9/004* (2013.01); *F25B 9/06* (2013.01)

(58) Field of Classification Search
CPC .. F01D 15/12; F25B 9/004; F25B 9/06; F04D 25/04; F04D 29/058; H02K 7/09; H02K 7/1823; H02K 9/102; H02K 21/24; B64D 2013/0644
See application file for complete search history.

(56) References Cited

U.S. PATENT DOCUMENTS

| | | |
|---|---|---|
| RE32,100 E | 4/1986 | Rannenberg |
| 5,490,645 A | 2/1996 | Woodhouse |
| 5,572,119 A | 11/1996 | Taylor |
| 5,709,103 A | 1/1998 | Williams |
| RE36,101 E | 2/1999 | Andres et al. |
| 6,058,715 A | 5/2000 | Strang et al. |
| 6,608,418 B2 | 8/2003 | Andres et al. |

(Continued)

FOREIGN PATENT DOCUMENTS

| | | |
|---|---|---|
| CN | 216269938 U | 4/2022 |
| EP | 1471002 A1 | 10/2004 |

OTHER PUBLICATIONS

Z.Q. Zhu, et al., "A Novel Axial Flux Magnetically Geared Machine for Power Split Application", from IEEE Transactions on Industry Applications, 54 (6), pp. 5954-5966.

(Continued)

*Primary Examiner* — Elizabeth J Martin
(74) *Attorney, Agent, or Firm* — Kinney & Lange, P.A.

(57) ABSTRACT

An air cycle machine includes a turbine section, a compressor section, and an axial flux magnetic gear system electromechanically coupling the turbine section to the compressor section. The axial flux magnetic gear system includes a stator, two rotors, a winding system, and a control module. The stator includes stator pole sections and is oriented about a stator axis. Each rotor includes magnets arranged radially about a rotational axis which is aligned with the stator axis. Each rotor interacts with the stator such that the rotor rotates at a rotational speed when the axial flux magnetic gear system is exposed to an electrical current. The winding system stabilizes the position of the rotors along their rotational axes. The control module is configured to supply the electrical current to at least one of the winding system, the stator, and the rotors to drive rotation of the rotors.

17 Claims, 4 Drawing Sheets

(56) References Cited

U.S. PATENT DOCUMENTS

| | | |
|---|---|---|
| 6,735,953 B1 | 5/2004 | Wolfe et al. |
| 6,776,002 B1 * | 8/2004 | Ho .......................... B64D 13/08 62/401 |
| 8,347,648 B2 | 1/2013 | Nakazeki et al. |
| 10,174,767 B2 | 1/2019 | Pal |
| 2016/0087517 A1 | 3/2016 | Powell et al. |
| 2017/0350405 A1 | 12/2017 | Sozer et al. |
| 2020/0277079 A1 | 9/2020 | Retersdorf et al. |
| 2022/0161932 A1 | 5/2022 | Sharpe |

OTHER PUBLICATIONS

Extended European Search Report for EP Application No. 23210418. 2, dated Apr. 22, 2024, 6 pages.

Extended European Search Report for EP Application No. 23211583. 2, dated Apr. 24, 2024, 6 pages.

Extended European Search Report for EP Application No. 23211822. 4, dated Apr. 24, 2024, 6 pages.

Non-Final Office Action dated Apr. 4, 2025, for corresponding U.S. Appl. No. 18/075,139, 23 pgs.

\* cited by examiner

GEARED AIR CYCLE MACHINE

BACKGROUND

The present invention relates generally to environmental control systems, and in particular to an air cycle machine configuration.

Environmental control systems condition a supply of air and deliver it to an enclosed section of an aircraft, such as a cabin or cockpit. An environmental control system can include an air cycle machine, which includes a compressor and at least one turbine, as well as at least one heat exchanger. The compressor and turbine(s) are typically located along a common shaft and accordingly rotate at the same speed (i.e., at the rotational speed of the common shaft). Conventionally, the rotational speed of a turbine and compressor system is established by balancing the amount of power the turbine(s) can generate with the amount of power consumed by the compressor. However, the compressor and turbine(s) have differing optimal rotational speeds at which they achieve peak efficiency. Operating the compressor and turbine(s) at a uniform speed results in a loss of performance and correspondingly increases the weight of the associated heat exchanger(s) and overall system weight. Additionally, the air cycle machine can require a booster compressor located upstream of the turbine in order to achieve the desired rotational speed in the compressor section, which adds additional weight to the system.

SUMMARY

An air cycle machine includes a turbine section, a compressor section, and an axial flux magnetic gear system electromechanically coupling the turbine section to the compressor section. The axial flux magnetic gear system includes a stator, a first rotor, a second rotor, a winding system, and a control module. The stator includes stator pole sections and is oriented about a stator axis. The first rotor includes a first plurality of magnets arranged radially about a first rotational axis aligned with the stator axis and configured to interact with the stator such that the first rotor rotates at a first rotational speed when the axial flux magnetic gear system is exposed to an electrical current. The second rotor includes a second plurality of magnets arranged radially about a second rotational axis aligned with the first rotational axis and being configured to interact with the stator such that the second rotor rotates at a second rotational speed when the axial flux magnetic gear system is exposed to the electrical current. The winding system stabilizes a position of the first rotor along the first rotational axis and a position of the second rotor along the second rotational axis. The control module is configured to supply the electrical current to at least one of the winding system, the stator, the first rotor, and the second rotor to drive rotation of the first rotor about the first rotational axis and the second rotor about the second rotational axis.

As further discussed herein, an air cycle machine includes a turbine section, a compressor section, and an electrical gearbox. The turbine section includes a plurality of turbine flow elements disposed about a turbine shaft. The compressor section includes a plurality of compressor flow elements disposed about a compressor shaft axially aligned with the turbine shaft. The electrical gearbox is located between, and electromechanically couples, the turbine shaft and the compressor shaft. The electrical gearbox includes a gearbox housing and an axial flux magnetic gear system comprising disposed within the gearbox housing. The axial flux magnetic gear system includes a stator, a first rotor, a second rotor, a winding system, and a control module. The stator includes a plurality of stator pole sections oriented about a stator axis, and located between the first rotor and the second rotor. The first rotor includes a first plurality of magnets arranged radially about a first rotational axis aligned with the stator axis and configured to interact with the stator such that the first rotor rotates at a first rotational speed when the axial flux magnetic gear system is exposed to an electrical current. The first rotor is mechanically coupled to the turbine shaft. The second rotor includes a second plurality of magnets arranged radially about a second rotational axis aligned with the first rotational axis and being configured to interact with the stator such that the second rotor rotates at a second rotational speed when the axial flux magnetic gear system is exposed to the electrical current. The second rotor is mechanically coupled to the compressor shaft. The winding system stabilizes a position of the first rotor along the first rotational axis and a position of the second rotor along the second rotational axis. The control module is configured to supply the electrical current to at least one of the winding system, the stator, the first rotor, and the second rotor to drive rotation of the first rotor about the first rotational axis and the second rotor about the second rotational axis.

As also discussed herein, a method of operating an air cycle machine for an aircraft includes generating an electrical current and supplying the electrical current to an axial flux magnetic gear system within an electrical gearbox of the air cycle machine. The axial flux magnetic gear system rotates a compressor shaft of the air cycle machine. The air cycle machine conditions an airflow for an aircraft cabin of the aircraft.

The present summary is provided only by way of example, and not limitation. Other aspects of the present disclosure will be appreciated in view of the entirety of the present disclosure, including the entire text, claims, and accompanying figures.

Figure 1:
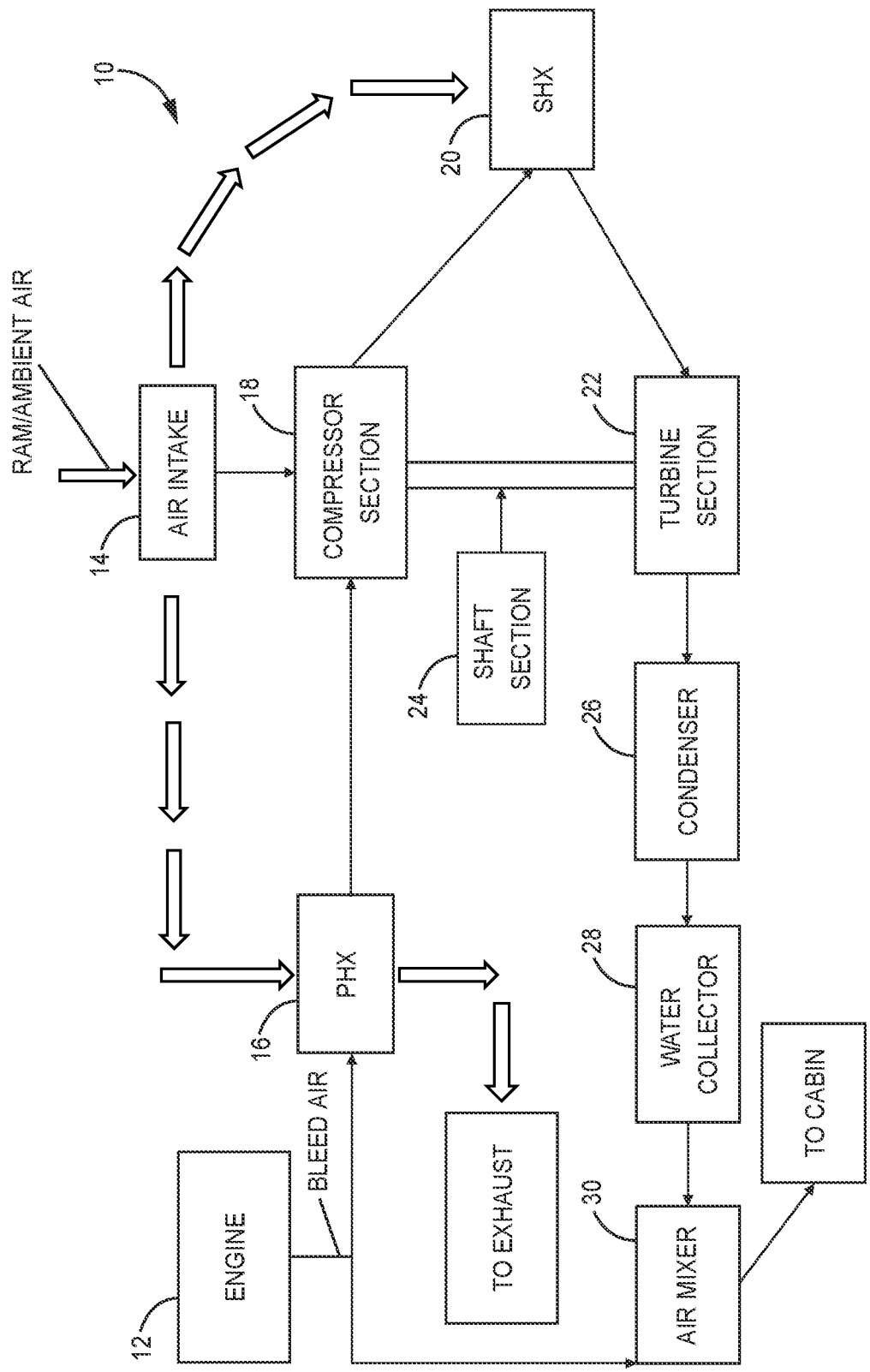
FIG. 1 is a schematic depiction of an environmental control system.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

An electrical gearbox can be integrated into an air cycle machine (ACM) for an aircraft to allow a difference in rotational speeds between the turbine and compressor sections. This provides the advantages of using magnetic bearings without the need for a separate control system, and allows the ACM to achieve higher efficiency.

A geared compressor-turbine connection as described herein allows a more optimal rotational speed to be selected for each component. Further, a geared system can have a wider operating range, and can achieve higher rotational speeds, than a non-geared system, while avoiding the stresses on the magnetic gears which can occur at the higher rotational speeds of powered geared motors. The use of a magnetic gear system (and, in some examples, magnetic bearings) can provide increased reliability and higher ACM efficiency without a large increase in size or weight.

FIG. 1 is a schematic depiction of environmental control system (ECS) 10. In the example shown in FIG. 1, ECS 10 is operatively connected to engine 12 and includes air intake 14, primary heat exchanger 16, compressor section 18, secondary heat exchanger 20, turbine section 22, shaft section 24, condenser 26, water collector 28, and air mixer 30. Shaft section 24 can include a compressor shaft and a turbine shaft (such as compressor shaft 220 and turbine shaft 222, both shown in FIG. 4). Compressor section 18 can include compressor flow elements which are disposed about the compressor shaft. Turbine section 22 can include turbine flow elements which are disposed about the turbine shaft. In some examples, the compressor shaft can be axially aligned with the turbine shaft. As described in more detail below, an electrical gearbox containing an axial flux magnetic gear system is used to electromechanically couple elements rotating at different speeds. In the specific embodiments detailed below, the axial flux magnetic gear system can be located between the turbine shaft and the compressor shaft and can electromechanically couple the turbine shaft and the compressor shaft.

Air intake 14 can include an inlet fan which is fluidly connected to an external environment of the aircraft such that air intake 14 can draw ambient air into ECS 10. Air intake 14 can additionally and/or alternatively include a ram air scoop. Compressor section 18 can include an air compressor which increases the pressure of an airflow as it passes through compressor section 18. Turbine section 22 can include an expansion turbine which removes energy from an airflow as it passes through turbine section 22, decreasing the temperature of the airflow as it expands. Primary heat exchanger 16 and secondary heat exchanger 20 can be air-to-air heat exchangers. Condenser 26 can be fluidly connected to turbine section 22 such that an airflow can exit turbine section 22 and enter condenser 26. Water collector 28 can be fluidly connected to condenser 26 and can be configured to extract water from an airflow. Air mixer 30 can be a chamber fluidly connected to water collector 28, engine 12, and the aircraft cabin such that air mixer 30 can receive conditioned air from water collector 28 and bleed air from engine 12, mix the conditioned air and bleed air to a desired temperature, and deliver it to the aircraft cabin.

ECS 10 can receive a flow of bleed air from a gas turbine engine, and the bleed air is directed into primary heat exchanger 16. In some examples, ECS 10 does not receive bleed air. The bleed air can be cooled with ambient air or ram air from air intake 14. The bleed air which has been cooled exits primary heat exchanger 16 and is directed to compressor section 18. Compressor section 18 compresses the cooled air, which increases the cooled air's pressure. The compressed air exits compressor section 18 and is directed to secondary heat exchanger 20 to be further cooled via heat exchange with a flow of ambient air or ram air. The compressed and cooled air exits secondary heat exchanger 20 and enters turbine section 22. The air expands within turbine section 22, and the rotation of one or more turbines within turbine section 22 can drive the rotation of a compressor within compressor section 18. The air exits turbine section 22 and enters condenser 26. Condenser 26 further cools the flow of air to condense the water vapor contained in the air. The air then enters water collector 28, which extracts the condensed water from the airflow and thereby dehumidifies the air. The dehumidified air exits water collector 28 and enters air mixer 30 to be mixed with additional, un-conditioned bleed air. This mixing allows the temperature of the resulting conditioned air to be adjusted to a level desirable for an aircraft cabin. The conditioned air is then delivered from air mixer 30 to the aircraft cabin.

As described above, compressor section 18 can include a compressor and turbine section 22 can include at least one turbine, and shaft section 24 can include a compressor shaft and turbine shaft. In this manner, compressor section 18, turbine section 22, and shaft section 24 can form a portion of an ACM such as ACM 100 (shown in FIG. 2).

Figure 2:
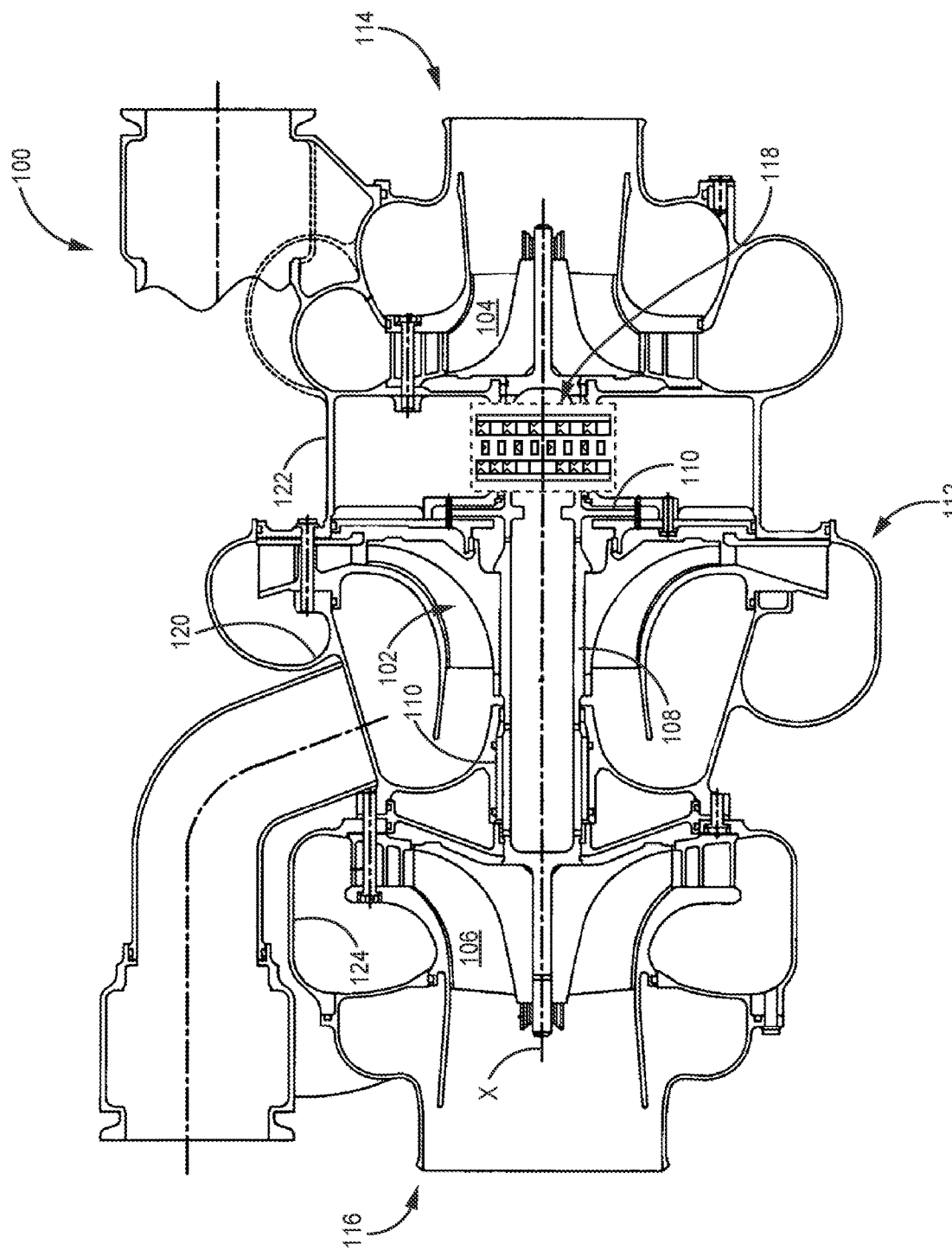
FIG. 2 is a simplified cross-sectional view of an air cycle machine including an electrical gearbox.

FIG. 2 is a cross-sectional view of ACM 100. ACM 100 includes compressor 102, first turbine 104, second turbine 106, shaft section 108, shaft section bearings 110, ACM housing 112, first axial diffuser 114, second axial diffuser 116, and electrical gearbox 118. ACM housing 112 includes compressor housing section 120, first turbine housing section 122, and second turbine housing portion 124.

Figure 4:
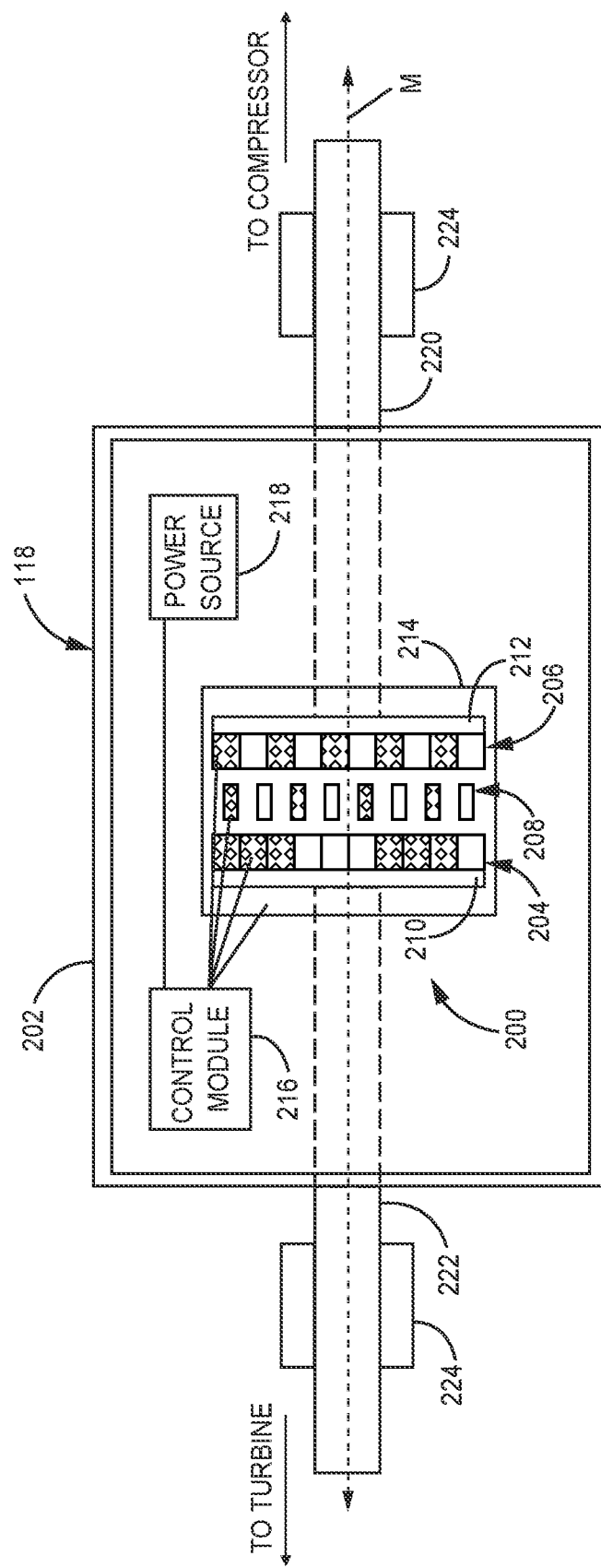
FIG. 4 is a schematic cross-sectional depiction of an electrical gearbox including a magnetic gear system.

Shaft section 108 can include a compressor shaft and a turbine shaft (such as compressor shaft 220 and turbine shaft 222, both shown in FIG. 4). Shaft section 108 is oriented along rotational axis X such that compressor 102, first turbine 104, and second turbine 106 rotate about rotational axis X. Electrical gearbox 118 is located within shaft section 108 and oriented along rotational axis X. Shaft section bearings 110 can support shaft section 108 within sections of ACM housing 112, such as compressor housing section 120, first turbine housing section 122, and/or second turbine housing portion 124. Shaft section bearings 110 can be magnetic bearings, airfoil bearings, ball bearings, or other suitable bearing systems.

As described above in reference to FIG. 1, the components of ACM 100 work to condition an airflow through an ECS (such as ECS 10). Compressor 102 compresses the airflow and increases the pressure, and first turbine 104 and second turbine 106 extract energy from the airflow through expansion of the airflow. As described in more detail below, a magnetic gear system within electrical gearbox 118 can drive rotation of compressor 102 through rotation of first turbine 104 and/or second turbine 106 while allowing for differing rotational speeds of compressor 102, first turbine 104, and second turbine 106.

Figures 3A, 3B:
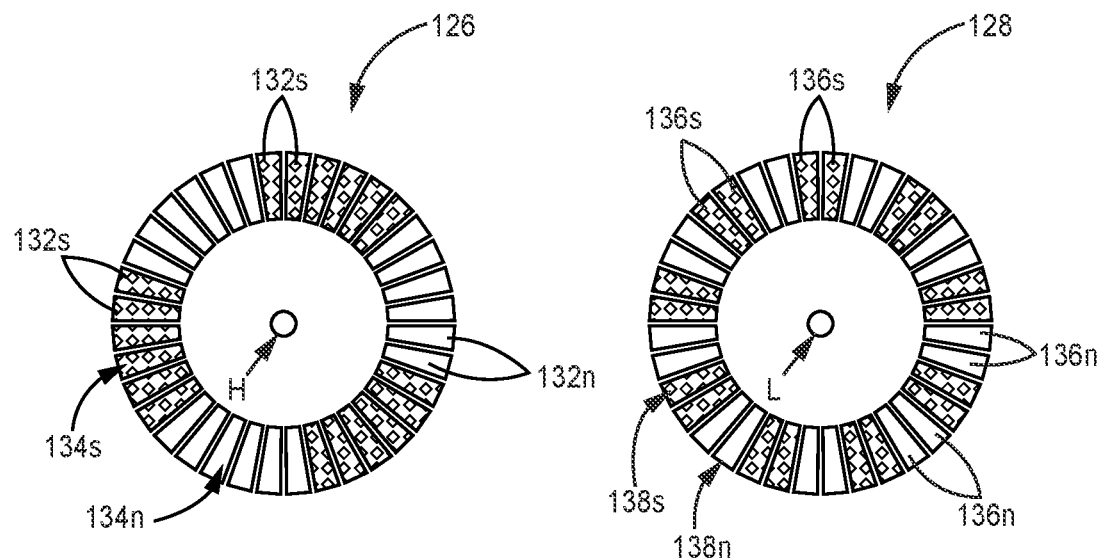
FIG. 3A is a schematic depiction of a high-speed rotor of a magnetic gear system.
FIG. 3B is a schematic depiction of a low-speed rotor of a magnetic gear system.
Figures 3C, 3D:
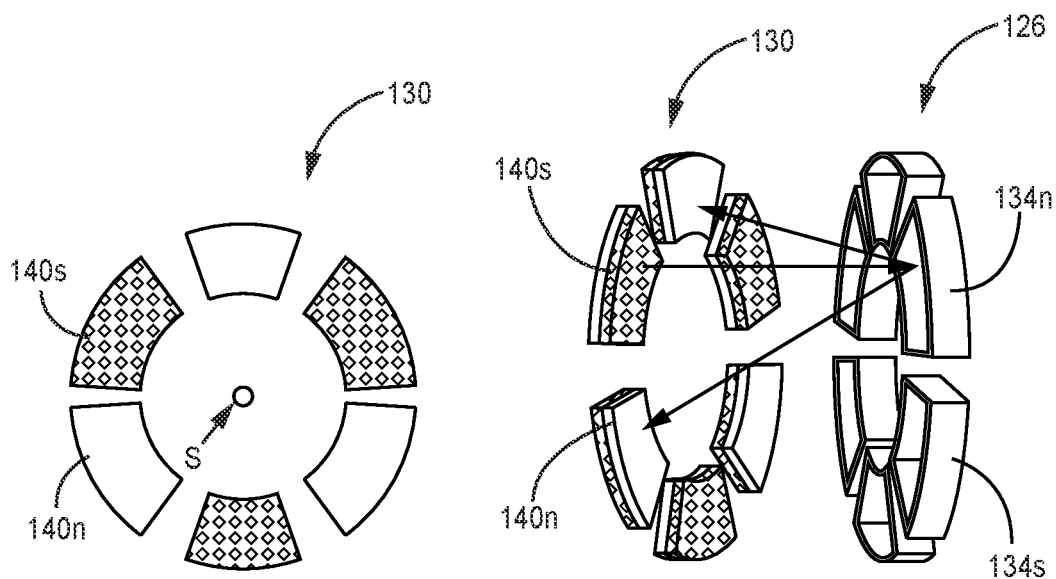
FIG. 3C is a schematic depiction of a stator of a magnetic gear system.
FIG. 3D is a schematic depiction of the interaction between a rotor and a stator of a magnetic gear system.

FIGS. 3A-3D illustrate various components of a magnetic gear system within an electrical gearbox (such as electrical gearbox 118 shown in FIG. 2). FIG. 3A is a schematic depiction of high-speed rotor 126. FIG. 3B is a schematic depiction of low-speed rotor 128. FIG. 3C is a schematic depiction of stator 130. FIG. 3D is a schematic depiction of the interaction between high-speed rotor 126 and stator 130 during operation of the magnetic gear system. FIGS. 3A-3D will be discussed in turn below.

In the example shown in FIG. 3A, high-speed rotor 126 includes magnets $132n$, $132s$ distributed circumferentially about rotational axis H. Magnets $132n$ are arranged in polarity sections $134n$ about high-speed rotor 126, and magnets $132s$ are arranged in polarity sections $134s$ about high-speed rotor 126 which are located between polarity sections 134n. In this manner, polarity sections 134n and 134s alternate circumferentially about high-speed rotor 126. In the example shown in FIG. 3A, high-speed rotor 126 has three pairs of polarity sections 134n, 134s. Magnets 132n are oriented such that the north pole of each magnet is oriented toward a stator of the magnetic gear system (such as stator 130 shown in FIG. 3C). Magnets 132s are oriented such that the south pole of each magnet is oriented toward a stator of the magnetic gear system (such as stator 130 shown in FIG. 3C). Magnets 132n, 132s can be permanent magnets.

In the example shown in FIG. 3B, low-speed rotor 128 includes magnets 136n. 136s distributed circumferentially about rotational axis L. Magnets 136n are arranged in polarity sections 138n about low-speed rotor 128, and magnets 136s are arranged in polarity sections 138s about low-speed rotor 128 which are located between polarity sections 138n. Polarity sections 138n and 138s thereby alternate circumferentially about low-speed rotor 128. In the example shown in FIG. 3A, low-speed rotor 128 has nine pairs of polarity sections 138n. 138s. Magnets 136n are oriented such that the north pole of each magnet is oriented toward a stator of the magnetic gear system (such as stator 130 shown in FIG. 3C). Magnets 136s are oriented such that the south pole of each magnet is oriented toward a stator of the magnetic gear system (such as stator 130 shown in FIG. 3C). Magnets 136n. 136s can be permanent magnets.

In the example shown in FIG. 3C, stator 130 includes stator pole sections 140n, 140s distributed circumferentially about stator axis S. Stator pole sections 140n, 140s can be arranged in pairs such that the polarity of each stator pole section alternates circumferentially about stator 130. Stator pole sections 140n, 140s can be a ferromagnetic material such as steel.

FIG. 3D depicts the interaction between high-speed rotor 126 and stator 130 during operation of electrical gearbox 118. Magnets 132n within each polarity section 134n of high-speed rotor 126 are attracted to stator pole sections 140s and repelled from stator pole sections 140n, while magnets 132s within each polarity section 134s of high-speed rotor 126 are repelled from stator pole sections 140s and attracted to stator pole sections 140n. This alternating cycle causes high-speed rotor 126 to rotate about rotational axis H. Low-speed rotor 128 operates in a substantially similar manner as high-speed rotor 126 with respect to the interaction with stator 130. The speed of rotation of high-speed rotor 126 and low-speed rotor 128 about their respective rotational axes H. L can depend on the number of pairs of polarity sections present within high-speed rotor 126 and low-speed rotor 128. High-speed rotor 126 rotates at a higher rotational speed than low-speed rotor 128 due to the lower number of pairs of polarity sections 134n, 134s within high-speed rotor 126. Because each polarity section 134n, 134s of high-speed rotor 126 takes up a larger angular percentage of high-speed rotor 126 than the polarity sections 138n, 138s of low-speed rotor 128, there is a greater rotational change between a polarity section 134n to a polarity section 134s within high-speed rotor 126. High-speed rotor 126 thereby travels a greater angular distance for each corresponding stator pole section 140n, 140s than low-speed rotor 128, and accordingly has a higher rotational speed than low-speed rotor 128.

In some examples, the number of polarity sections 134n, 134s, 138n, 138s within high-speed rotor 126 and/or low-speed rotor 128 can be varied to select a desired rotational speed of both rotors. As described in more detail below in reference to FIG. 4, the rotor sections can be designed to achieve a desired rotational speed of the compressor. This allows for the gear ratio of the magnetic gear system to be changed through the replacement of one or both rotors. Additionally or alternatively, in some examples, electrical gearbox 118 can include a magnetic gear system which has characteristics of both an axial magnetic gear system (such as magnetic gear system 200 shown in FIG. 4) and a radial magnetic gear system (i.e., a system in which the rotors and stator are arranged coaxially about the rotational axis). Additionally or alternatively, in some examples, stator pole sections 140n, 140s can include concentrated windings in a hybrid flux application. These concentrated windings increase the torque of the system by creating additional interactions between the flux generated by each rotor.

FIG. 4 is a schematic cross-sectional depiction of electrical gearbox 118 which includes magnetic gear system 200, which is oriented along magnetic gear system axis M, and gearbox housing 202. In the example illustrated in FIG. 4, magnetic gear system 200 includes first rotor 204, second rotor 206, stator 208, backing plates 210, 212, winding system 214, control module 216, and power source 218. Compressor shaft 220 and turbine shaft 222 include stabilization systems 224.

As described above in reference to high-speed rotor 126 and low-speed rotor 128 of FIGS. 3A-3B, first rotor 204 and second rotor 206 can be made up of magnets which are arranged about the rotational axis of the corresponding rotor, and which are grouped into polarity sections. As described above in reference to stator 130 of FIG. 3C, stator 208 can be made up of stator pole sections which are arranged in an alternating polarity pattern about stator 208.

First rotor 204, second rotor 206, and stator 208 are each oriented about magnetic gear system axis M such that stator 208 is located between first rotor 204 and second rotor 206 along magnetic gear system axis M (i.e., such that the stator axis and the rotational axes of the rotors are aligned). Backing plate 210 is located immediately adjacent to first rotor 204 such that first rotor 204 is located between stator 208 and backing plate 210, and backing plate 212 is located immediately adjacent to second rotor 206 such that second rotor 206 is located between stator 208 and backing plate 212. Axial air gaps separate first rotor 204, stator 208, and second rotor 206 to permit contactless rotation of first rotor 204 and second rotor 206 with respect to stator 208. Winding system 214 can be, for example, a wire coil which surrounds first rotor 204, stator 208, and second rotor 206.

Control module 216 is a logic-capable device such as a processor or other suitable electronic controller that is electrically connected to at least one of first rotor 204, stator 208, second rotor 206, and winding system 214. Additionally or alternatively, control module 216 can be configured to control stabilization system 224 in examples where stabilization system 224 includes magnetic bearings. For example, control module 216 can be configured to monitor and adjust the position of the magnetic bearings. Power source 218 can be electrically connected to control module 216, and additionally or alternatively can be directly electrically connected to at least one of first rotor 204, stator 208, second rotor 206, and winding system 214. While control module 216 and power source 218 are illustrated in FIG. 4 as being located within electrical gearbox 118, in some examples control module 216 and/or power source 218 can be externally located to electrical gearbox 118 and can have a wired or wireless connection to electrical gearbox 118 and/or the components within electrical gearbox 118. While control module 216 and power source 218 are illustrated in FIG. 4 as being discrete and separated components, in some examples control module 216 and power source 218 can be integrated into a single component.

As described above in reference to high-speed rotor 126 and low-speed rotor 128 of FIGS. 3A-3D, first rotor 204 and second rotor 206 interact with stator 208 such that both first rotor 204 and second rotor 206 rotate about their respective rotational axes. Backing plate 210 is connected to first rotor 204 by suitable means, and accordingly rotates at an equivalent rotational speed to first rotor 204. Similarly, backing plate 212 is connected to second rotor 206 such that backing plate 212 and second rotor 206 rotate at an equivalent rotational speed. Backing plate 210 can be connected to turbine shaft 222, and can in some examples backing plate 210 and turbine shaft 222 can form a monolithic structure. Similarly, backing plate 212 can be connected to compressor shaft 220, and in some examples backing plate 212 and compressor shaft 220 can form a monolithic structure. First rotor 204 and turbine shaft 222 are accordingly mechanically coupled through the connection with backing plate 210, and second rotor 206 and compressor shaft 220 are mechanically coupled through the connection with backing plate 212. Winding system 214 can generate a magnetic field when supplied with an electrical current (for example, from control module 216 and/or power source 218). In this way, winding system 214 can stabilize the position of first rotor 204 and/or second rotor 206 along each rotor's respective rotational axis. Control module 216 can supply an electrical current to first rotor 204, stator 208, second rotor 206, and/or winding system 214. This electrical current can be generated by the electromagnetic effects of the magnetic gears' rotation. Stabilization systems 224 can support at least a portion of turbine shaft 222 and or compressor shaft 220, and thereby can stabilize the position of turbine shaft 222 and/or compressor shaft 220 along the rotational axis of turbine shaft 222 and/or compressor shaft 220. Each stabilization system 224 can be, for example, a bearing system (such as shaft section bearings 110, shown in FIG. 2). The bearing system can include magnetic thrust bearings which axially stabilize the shafts, air bearings, or another suitable bearing type. Stabilization systems 224 can include magnetic bearings, or, alternatively, magnetic gear system 200 can perform the function of magnetic bearings by axially stabilizing the shafts without an additional bearing system. The magnetic bearings, or magnetic gear system 200 providing the functionality of magnetic bearings, enable very high rotational speeds as compared to air bearings.

In the example depicted in FIG. 4, magnetic gear system 200 is an axial flux magnetic gear system. The rotation of turbine shaft 222 (driven by the rotation of a turbine such as turbines 104, 106 in FIG. 2) drives the rotation of first rotor 204. In turn, the rotation of first rotor 204 and second rotor 206 drives the rotation of compressor shaft 220 (which drives the rotation of a compressor such as compressor 102 in FIG. 2). The mechanical coupling of turbine shaft 222 to first rotor 204, the mechanical coupling of compressor shaft 220 to second rotor 206, and the electromagnetic coupling of first rotor 204 and second rotor 206 allow for different rotational speeds between compressor shaft 220 and turbine shaft 222 while still allowing the compressor and turbine to be located along a common rotational axis.

In some examples, magnetic gear system 200 can be a hybrid flux magnetic gear system, such as a system which has characteristics of both an axial magnetic gear system and a radial magnetic gear system. This hybrid flux magnetic gear system can, for example, include windings for each stator pole section, adding additional torque to the system. Additionally and/or alternatively, magnetic gear system 200 can provide changeable gear ratios through the use of rotors having differing numbers of polarity sections, as described above in reference to FIGS. 3A-3D. The number of magnets in each of first rotor 204 and second rotor 206 can be selected based on a desired gear ratio of magnetic gear system 200. While first rotor 204 is illustrated in FIG. 4 as having a lower number of polarity sections than second rotor 206 (and accordingly having a higher rotational speed than second rotor 206), in some examples first rotor 204 can have a higher number of polarity sections (and accordingly, a lower rotational speed) than second rotor 206. The number of polarity sections in first rotor 204 and/or second rotor 206 can be varied to ensure an efficient rotational speed for compressor shaft 220 and/or turbine shaft 222.

An ACM including a magnetic gear system as described herein provides numerous advantages. Tailoring the rotational speed of the compressor and turbine(s) to each component's peak efficiency levels can increase the efficiency of the ACM. A more efficient ACM can allow for the weight of the heat exchangers in the system, and accordingly for the system weight as a whole, to be decreased. Incorporating a magnetic gear system provides similar advantages to incorporating magnetic bearings (such as high reliability and higher-precision clearance control) without the need for integrating a separate magnetic bearing system, which would add weight and require a separate control system. Decreasing the number of wear surfaces can increase part lifetime and decrease part failure risk. Finally, the use of a geared, non-powered system can help to avoid stress and damage (such as cracking) to the magnetic gears within the system by remaining below the rotational speed of a powered geared system.

Discussion of Possible Embodiments

The following are non-exclusive descriptions of possible embodiments of the present invention.

An air cycle machine includes a turbine section, a compressor section, and an axial flux magnetic gear system electromechanically coupling the turbine section to the compressor section. The axial flux magnetic gear system includes a stator, a first rotor, a second rotor, a winding system, and a control module. The stator includes stator pole sections and is oriented about a stator axis. The first rotor includes a first plurality of magnets arranged radially about a first rotational axis aligned with the stator axis and configured to interact with the stator such that the first rotor rotates at a first rotational speed when the axial flux magnetic gear system is exposed to an electrical current. The second rotor includes a second plurality of magnets arranged radially about a second rotational axis aligned with the first rotational axis and being configured to interact with the stator such that the second rotor rotates at a second rotational speed when the axial flux magnetic gear system is exposed to the electrical current. The winding system stabilizes a position of the first rotor along the first rotational axis and a position of the second rotor along the second rotational axis. The control module is configured to supply the electrical current to at least one of the winding system, the stator, the first rotor, and the second rotor to drive rotation of the first rotor about the first rotational axis and the second rotor about the second rotational axis.

The air cycle machine of the preceding paragraph can optionally include, additionally and/or alternatively, any one or more of the following features, configurations and/or additional components:

An air cycle machine according to an exemplary embodiment of the present invention, among other possible things, includes a turbine section, a compressor section, and an axial flux magnetic gear system electromechanically coupling the turbine section to the compressor section. The axial flux magnetic gear system includes a stator, a first rotor, a second rotor, a winding system, and a control module. The stator includes stator pole sections and is oriented about a stator axis. The first rotor includes a first plurality of magnets arranged radially about a first rotational axis aligned with the stator axis and configured to interact with the stator such that the first rotor rotates at a first rotational speed when the axial flux magnetic gear system is exposed to an electrical current. The second rotor includes a second plurality of magnets arranged radially about a second rotational axis aligned with the first rotational axis and being configured to interact with the stator such that the second rotor rotates at a second rotational speed when the axial flux magnetic gear system is exposed to the electrical current. The winding system stabilizes a position of the first rotor along the first rotational axis and a position of the second rotor along the second rotational axis. The control module is configured to supply the electrical current to at least one of the winding system, the stator, the first rotor, and the second rotor to drive rotation of the first rotor about the first rotational axis and the second rotor about the second rotational axis.

A further embodiment of the foregoing air cycle machine, wherein the first rotational speed is greater than the second rotational speed.

A further embodiment of any of the foregoing air cycle machines, wherein the second rotational speed is greater than the first rotational speed.

A further embodiment of any of the foregoing air cycle machines, wherein the first rotor is operatively connected to a turbine of the air cycle machine and the second rotor is operatively connected to a compressor of the air cycle machine such that rotation of the turbine drives rotation of the first rotor and rotation of the second rotor drives rotation of the compressor.

A further embodiment of any of the foregoing air cycle machines, further comprising a stabilization system for at least one shaft of the air cycle machine which stabilizes a position of the at least one shaft along a rotational axis of the at least one shaft.

A further embodiment of any of the foregoing air cycle machines, wherein the stabilization system is a bearing system.

A further embodiment of any of the foregoing air cycle machines, wherein the first rotor comprises a first number of magnets, the second rotor comprises a second number of magnets, and the first number of magnets relative to the second number of magnets is determined by a gear ratio of the axial flux magnetic gear system.

An air cycle machine includes a turbine section, a compressor section, and an electrical gearbox. The turbine section includes a plurality of turbine flow elements disposed about a turbine shaft. The compressor section includes a plurality of compressor flow elements disposed about a compressor shaft axially aligned with the turbine shaft. The electrical gearbox is located between, and electromechanically couples, the turbine shaft and the compressor shaft. The electrical gearbox includes a gearbox housing and an axial flux magnetic gear system comprising disposed within the gearbox housing. The axial flux magnetic gear system includes a stator, a first rotor, a second rotor, a winding system, and a control module. The stator includes a plurality of stator pole sections oriented about a stator axis, and located between the first rotor and the second rotor. The first rotor includes a first plurality of magnets arranged radially about a first rotational axis aligned with the stator axis and configured to interact with the stator such that the first rotor rotates at a first rotational speed when the axial flux magnetic gear system is exposed to an electrical current. The first rotor is mechanically coupled to the turbine shaft. The second rotor includes a second plurality of magnets arranged radially about a second rotational axis aligned with the first rotational axis and being configured to interact with the stator such that the second rotor rotates at a second rotational speed when the axial flux magnetic gear system is exposed to the electrical current. The second rotor is mechanically coupled to the compressor shaft. The winding system stabilizes a position of the first rotor along the first rotational axis and a position of the second rotor along the second rotational axis. The control module is configured to supply the electrical current to at least one of the winding system, the stator, the first rotor, and the second rotor to drive rotation of the first rotor about the first rotational axis and the second rotor about the second rotational axis.

The air cycle machine of the preceding paragraph can optionally include, additionally and/or alternatively, any one or more of the following features, configurations and/or additional components:

An air cycle machine according to an exemplary embodiment of the present invention, among other possible things, includes a turbine section, a compressor section, and an electrical gearbox. The turbine section includes a plurality of turbine flow elements disposed about a turbine shaft. The compressor section includes a plurality of compressor flow elements disposed about a compressor shaft axially aligned with the turbine shaft. The electrical gearbox is located between, and electromechanically couples, the turbine shaft and the compressor shaft. The electrical gearbox includes a gearbox housing and an axial flux magnetic gear system comprising disposed within the gearbox housing. The axial flux magnetic gear system includes a stator, a first rotor, a second rotor, a winding system, and a control module. The stator includes a plurality of stator pole sections oriented about a stator axis, and located between the first rotor and the second rotor. The first rotor includes a first plurality of magnets arranged radially about a first rotational axis aligned with the stator axis and configured to interact with the stator such that the first rotor rotates at a first rotational speed when the axial flux magnetic gear system is exposed to an electrical current. The first rotor is mechanically coupled to the turbine shaft. The second rotor includes a second plurality of magnets arranged radially about a second rotational axis aligned with the first rotational axis and being configured to interact with the stator such that the second rotor rotates at a second rotational speed when the axial flux magnetic gear system is exposed to the electrical current. The second rotor is mechanically coupled to the compressor shaft. The winding system stabilizes a position of the first rotor along the first rotational axis and a position of the second rotor along the second rotational axis. The control module is configured to supply the electrical current to at least one of the winding system, the stator, the first rotor, and the second rotor to drive rotation of the first rotor about the first rotational axis and the second rotor about the second rotational axis.

A further embodiment of the foregoing air cycle machine, wherein the first rotor is connected to the turbine shaft and the second rotor is connected to the compressor shaft such that rotation of the turbine drives rotation of the first rotor through rotation of the turbine shaft and rotation of the second rotor drives rotation of the compressor through rotation of the compressor shaft.

A further embodiment of any of the foregoing air cycle machines, further comprising a primary heat exchanger, a secondary heat exchanger, a condenser, a water collector, and an air mixer.

A further embodiment of any of the foregoing air cycle machines, further comprising a stabilization system for at least one of the turbine shaft and the compressor shaft, which stabilizes a position of the at least one of the turbine shaft and the compressor shaft along a rotational axis of the at least one of the turbine shaft and the compressor shaft.

A further embodiment of any of the foregoing air cycle machines, wherein the stabilization system comprises a bearing system.

A further embodiment of any of the foregoing air cycle machines, wherein the first rotor comprises a first number of magnets, the second rotor comprises a second number of magnets, and the first number of magnets relative to the second number of magnets is determined by a gear ratio of the axial flux magnetic gear system.

A method of operating an air cycle machine for an aircraft includes generating an electrical current and supplying the electrical current to an axial flux magnetic gear system within an electrical gearbox of the air cycle machine. The axial flux magnetic gear system rotates a compressor shaft of the air cycle machine. The air cycle machine conditions an airflow for an aircraft cabin of the aircraft.

The method of the preceding paragraph can optionally include, additionally and/or alternatively, any one or more of the following features, configurations and/or additional components:

A method of operating an air cycle machine for an aircraft according to an exemplary embodiment of the present invention, among other possible things, includes generating an electrical current and supplying the electrical current to an axial flux magnetic gear system within an electrical gearbox of the air cycle machine. The axial flux magnetic gear system rotates a compressor shaft of the air cycle machine. The air cycle machine conditions an airflow for an aircraft cabin of the aircraft.

A further embodiment of the foregoing method, wherein supplying the electrical current to the axial flux magnetic gear system within the electrical gearbox of the air cycle machine comprises supplying the electrical current to at least one of a winding system of the axial flux magnetic gear system, a stator of the axial flux magnetic gear system, a first rotor of the axial flux magnetic gear system, and a second rotor of the axial flux magnetic gear system. The first rotor is configured to interact with a stator of the axial flux magnetic gear system such that the first rotor rotates about a magnetic gear system axis at a first rotational speed when the axial flux magnetic gear system is exposed to the electrical current. The stator comprises a plurality of stator pole sections and is oriented along the magnetic gear system axis. The second rotor is configured to interact with the stator such that the second rotor rotates about the magnetic gear system axis at a second rotational speed when the axial flux magnetic gear system is exposed to the electrical current. The winding system stabilizes a position of the first rotor and a position of the second rotor along the magnetic gear system axis. Rotating the compressor shaft of the air cycle machine using the axial flux magnetic gear system comprises rotating a turbine shaft through operation of a turbine of the air cycle machine, rotating the first rotor about the magnetic gear system axis through rotation of the turbine shaft, rotating the second rotor about the magnetic gear system axis, and rotating the compressor shaft through rotation of the second rotor. The first rotor is mechanically coupled to the turbine shaft. The second rotor is mechanically coupled to the compressor shaft.

A further embodiment of any of the foregoing methods, wherein conditioning the airflow for the aircraft cabin of the aircraft using the air cycle machine comprises receiving a flow of air which is bleed air from an engine of the aircraft, directing the flow of air through a primary heat exchanger, compressing the flow of air with a compressor of the air cycle machine which is connected to the compressor shaft, directing the flow of air through a turbine of the air cycle machine, and delivering the flow of air to the aircraft cabin.

A further embodiment of any of the foregoing methods, wherein conditioning the airflow for the aircraft cabin of the aircraft using the air cycle machine further comprises directing the flow of air through a secondary heat exchanger, condensing water vapor in the flow of air using a condenser of the air cycle machine, collecting water from the flow of air using a water collector of the air cycle machine, and mixing the flow of air with bleed air from the engine before delivering the flow of air to the aircraft cabin.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air cycle machine comprising:
   a turbine section;
   a compressor section; and
   an axial flux magnetic gear system electromechanically coupling the turbine section to the compressor section, the axial flux magnetic gear system comprising:
      a stator comprising a plurality of stator pole sections and oriented about a magnetic gear system axis such that the plurality of stator pole sections are distributed circumferentially about the magnetic gear system axis;
      a first rotor comprising a first plurality of magnets distributed circumferentially about the magnetic gear system axis and configured to interact with the stator such that the first rotor rotates at a first rotational speed when the axial flux magnetic gear system is exposed to an electrical current;
      a second rotor comprising a second plurality of magnets distributed circumferentially about the magnetic gear system axis and configured to interact with the stator such that the second rotor rotates at a second rotational speed when the axial flux magnetic gear system is exposed to the electrical current;
      a winding system operable to stabilize a position of the first rotor and a position of the second rotor along the magnetic gear system axis; and
      a control module configured to drive rotation of the second rotor about the magnetic gear system by supplying the electrical current to at least one of: the winding system, the stator, the first rotor, and the second rotor.

2. The air cycle machine of claim 1, wherein the first rotational speed is greater than the second rotational speed.

3. The air cycle machine of claim 1, wherein the second rotational speed is greater than the first rotational speed.

4. The air cycle machine of claim 1, wherein the first rotor is operatively connected to a turbine of the air cycle machine and the second rotor is operatively connected to a compressor of the air cycle machine such that rotation of the turbine drives rotation of the first rotor and rotation of the second rotor drives rotation of the compressor.

5. The air cycle machine of claim 1, further comprising a stabilization system for at least one shaft of the air cycle machine which stabilizes a position of the at least one shaft along a rotational axis of the at least one shaft.

6. The air cycle machine of claim 5, wherein the stabilization system is a bearing system.

7. The air cycle machine of claim 1, wherein:
the first rotor comprises a first number of magnets;
the second rotor comprises a second number of magnets; and
the first number of magnets relative to the second number of magnets is determined by a gear ratio of the axial flux magnetic gear system.

8. An air cycle machine comprising:
a turbine section comprising a plurality of turbine flow elements disposed about a turbine shaft;
a compressor section comprising a plurality of compressor flow elements disposed about a compressor shaft axially aligned with the turbine shaft; and
an electrical gearbox located between and electromechanically coupling the turbine shaft and the compressor shaft, the electrical gearbox comprising:
a gearbox housing; and
an axial flux magnetic gear system comprising disposed within the gearbox housing and comprising:
a stator comprising a plurality of stator pole sections oriented about a magnetic gear system axis such that the plurality of stator pole sections are distributed circumferentially about the magnetic gear system axis, and located between a first rotor and second rotor;
the first rotor, comprising a first plurality of magnets distributed circumferentially about the magnetic gear system axis and configured to interact with the stator such that the first rotor rotates at a first rotational speed when the axial flux magnetic gear system is exposed to an electrical current, wherein the first rotor is mechanically coupled to the turbine shaft;
the second rotor, comprising a second plurality of magnets distributed circumferentially about the magnetic gear system axis and configured to interact with the stator such that the second rotor rotates at a second rotational speed when the axial flux magnetic gear system is exposed to the electrical current, wherein the second rotor is mechanically coupled to the compressor shaft;
a winding system operable to stabilize a position of the first rotor and a position of the second rotor along the magnetic gear system axis; and
a control module configured to drive rotation of the second rotor about the magnetic gear system by supplying the electrical current to at least one of: the winding system, the stator, the first rotor, and the second rotor.

9. The air cycle machine of claim 8, wherein the first rotor is connected to the turbine shaft and the second rotor is connected to the compressor shaft such that rotation of the turbine drives rotation of the first rotor through rotation of the turbine shaft and rotation of the second rotor drives rotation of the compressor through rotation of the compressor shaft.

10. The air cycle machine of claim 8, further comprising:
a primary heat exchanger;
a secondary heat exchanger;
a condenser;
a water collector; and
an air mixer.

11. The air cycle machine of claim 8, further comprising a stabilization system for at least one of the turbine shaft and the compressor shaft, which stabilizes a position of the at least one of the turbine shaft and the compressor shaft along a rotational axis of the at least one of the turbine shaft and the compressor shaft.

12. The air cycle machine of claim 11, wherein the stabilization system comprises a bearing system.

13. The air cycle machine of claim 8, wherein:
the first rotor comprises a first number of magnets;
the second rotor comprises a second number of magnets; and
the first number of magnets relative to the second number of magnets is determined by a gear ratio of the axial flux magnetic gear system.

14. A method of operating an air cycle machine for an aircraft, the method comprising:
generating an electrical current;
supplying the electrical current to an axial flux magnetic gear system within an electrical gearbox of the air cycle machine;
rotating a compressor shaft of the air cycle machine using the axial flux magnetic gear system; and
conditioning an airflow for an aircraft cabin of the aircraft using the air cycle machine.

15. The method of claim 14, wherein:
supplying the electrical current to the axial flux magnetic gear system within the electrical gearbox of the air cycle machine comprises supplying the electrical current to at least one of a winding system of the axial flux magnetic gear system, a stator of the axial flux magnetic gear system, a first rotor of the axial flux magnetic gear system, and a second rotor of the axial flux magnetic gear system, wherein:
the first rotor is configured to interact with a stator of the axial flux magnetic gear system such that the first rotor rotates about a magnetic gear system axis at a first rotational speed when the axial flux magnetic gear system is exposed to the electrical current, wherein the stator comprises a plurality of stator pole sections and is oriented along the magnetic gear system axis;
the second rotor is configured to interact with the stator such that the second rotor rotates about the magnetic gear system axis at a second rotational speed when the axial flux magnetic gear system is exposed to the electrical current; and
the winding system stabilizes a position of the first rotor and a position of the second rotor along the magnetic gear system axis; and
rotating the compressor shaft of the air cycle machine using the axial flux magnetic gear system comprises:
rotating a turbine shaft through operation of a turbine of the air cycle machine;

rotating the first rotor about the magnetic gear system axis through rotation of the turbine shaft, wherein the first rotor is mechanically coupled to the turbine shaft;

rotating the second rotor about the magnetic gear system axis; and rotating the compressor shaft through rotation of the second rotor, wherein the second rotor is mechanically coupled to the compressor shaft.

16. The method of claim 14, wherein conditioning the airflow for the aircraft cabin of the aircraft using the air cycle machine comprises:

receiving a flow of air which is bleed air from an engine of the aircraft;

directing the flow of air through a primary heat exchanger;

compressing the flow of air with a compressor of the air cycle machine which is connected to the compressor shaft;

directing the flow of air through a turbine of the air cycle machine; and delivering the flow of air to the aircraft cabin.

17. The method of claim 16, wherein conditioning the airflow for the aircraft cabin of the aircraft using the air cycle machine further comprises:

directing the flow of air through a secondary heat exchanger;

condensing water vapor in the flow of air using a condenser of the air cycle machine;

collecting water from the flow of air using a water collector of the air cycle machine; and mixing the flow of air with bleed air from the engine before delivering the flow of air to the aircraft cabin.

* * * * *